Figure 1:
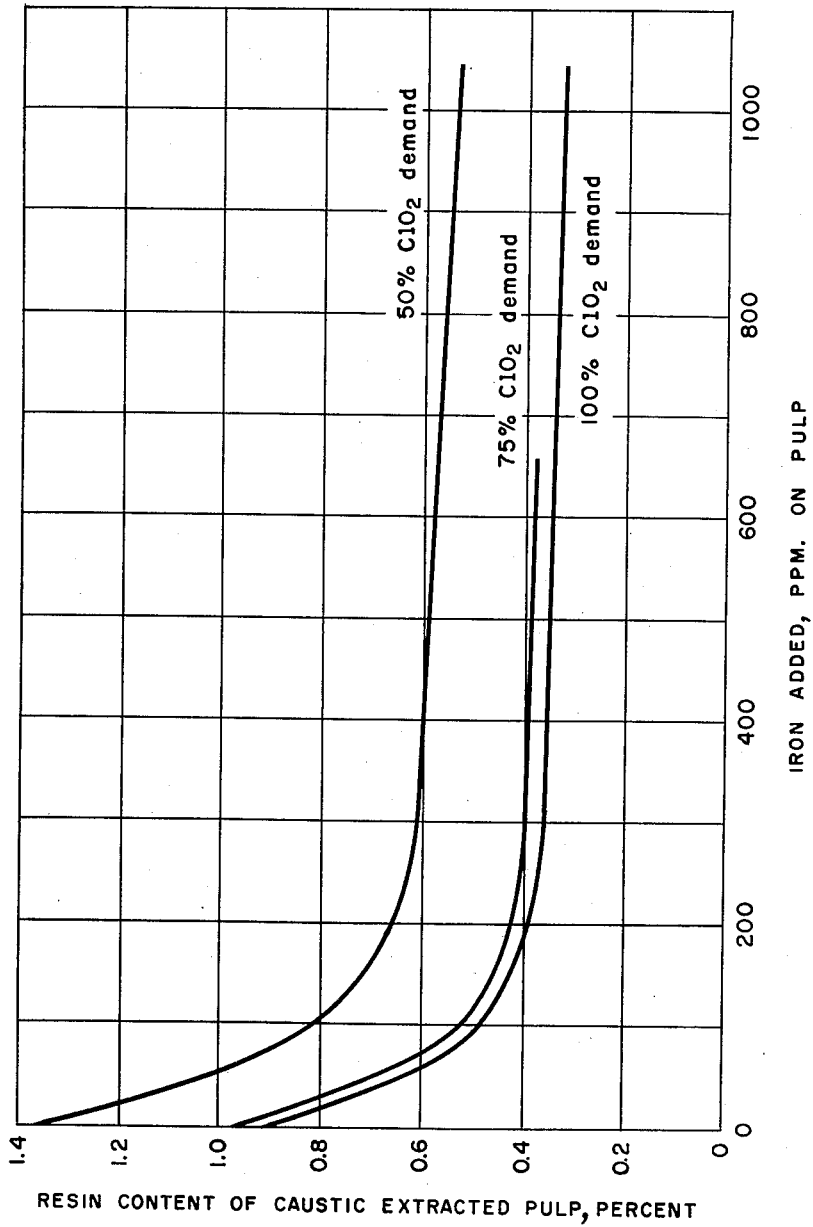

United States Patent Office 3,061,504
Patented Oct. 30, 1962

3,061,504
METHOD OF REMOVING RESIN FROM WOOD PULP
Donald B. Mutton, Hawkesbury, Ontario, Canada, assignor to Canadian International Paper Company, Montreal, Quebec, Canada, a corporation of Quebec, Canada
Filed Mar. 21, 1960, Ser. No. 16,225
13 Claims. (Cl. 162—65)

The present invention relates to a process for manufacturing purified wood pulp or cellulose, particularly wood pulp or cellulose of a very low resin content.

In the manufacture of almost any grade of wood pulp, it is usually desirable to remove from the pulp as completely as possible the wood extractives or resin. Resin is made up of such solvent-extractable substances as fats, fatty acids, resin acids, sterols and hydrocarbons, present in the wood. "Resin" is generally defined as the material which can be extracted from wood or pulp by neutral organic solvents, and it is to the removal of this material that the present invention is directed.

The presence of appreciable amounts of resin in pulp is detrimetal for several reasons. For all grades of pulp, a high resin content presents the danger of pitch deposition during purification and processing of the pulp. In the case of dissolving grades of pulp used in producing viscose rayon, cellophane, plastics and cellulose derivatives, resin imparts an undesirable yellow or brown colour to rayon or acetate yarn, film or other material prepared from the pulp, or to molded articles in which the pulp is used as a filler. Resin is also believed to affect adversely the filterability of viscose and the strength of rayon yarn and cord. In pulp to be used in making blotting or saturating paper, resin is objectionable since it may interfere with the absorptive properties of the paper. Poor or non-uniform absorption caused by high resin contents may also decrease the reactivity of pulps used for preparing cellulose derivatives. In view of the disadvantages of the resin in wood pulp, much effort has been directed to remove it from the pulp.

In the bleaching of sulphite pulps, a typical sequence involves treating the pulp with aqueous chlorine, followed by extraction with hot, dilute alkali, and a final bleach with calcium or sodium hypochlorite. Although such a purification process is designed primarily to remove lignin and hemicelluloses from the pulp, it is usually successful in reducing the resin content of the resulting bleached pulp to an acceptably low level (approximately 0.2% or less). However, when this bleaching sequence is applied to unbleached pulps prepared from certain hardwoods such as birch and poplar, it is completely ineffective in removing the resin. This is due to a number of factors, including the hight initial resin content of the unbleached pulp (up to 5%), the insolubility and inaccessibility of the resin in the pulp, and the chemical nature of certain components of the resin. For example, a sample of unbleached white birch pulp containing 3.68% resin was bleached according to the sequence described above for sulfite pulps. The resin content of the resulting bleached pulp had increased to 4.77%. In such cases involving hardwood pulps, it is not unusual for the resin content of the bleached pulp to be higher than that of the unbleached. This is apparently due to the addition of chlorine to the unsaturated compounds in the resin, thus not only increasing the weight of the resin, but also making it much less susceptible to removal during subsequent bleaching operations.

Much better results in deresinating hardwood pulps can be achieved by replacing the chlorination stage by a treatment with aqueous chlorine dioxide, and by using certain surfactants in the caustic extraction stage. The advantages of such a process have been described in a United States Patent No. 2,716,058, issued to W. H. Rapson and M. Wayman August 23, 1955, and assigned to the Canadian International Paper Company. The deresinating action increases as the chlorine dioxide addition in the first bleaching stage is increased up to about 100% of the chlorine dioxide demand of the pulp. (The chlorine dioxide demand is defined as the minimum amount of chlorine dioxide which must be added to leave a residual chlorine dioxide concentration of 0.4% as bleach, calculated on pulp, and the term will be used herein in accordance with this definition.) Increasing the concentration of chlorine dioxide produces no further deresinating action.

The process of the aforementioned patent is capable of giving substantial reductions in resin content in pulps and provided a great step forward. However, it has now been discovered that wood pulps, particularly of hardwoods, can be deresinated more effectively and with greater economy by means of the process of the present innvention.

It is an object of this invention to provide a process for removing resin from wood pulp.

It is another object of this invention to provide a process for removing resin from wood pulp made from freshly cut, unseasoned wood.

It is a further object of this invention to provide a process for effectively removing resin from pulps of hardwoods, particularly white birch pulp.

The above-enumerated objects, as well as other objects, together with the advantages of the invention, will be readily comprehended by persons skilled in the art upon reference to the present description, taken in conjunction with the accompanying drawing, which is a graph showing the degree of deresination of wood pulp obtained in accordance with various modifications of the process of the present invention.

The present invention results from the discovery that the use of soluble iron salts in conjunction with treatment by chlorine dioxide makes possible reduction of the resin content of wood pulps, particularly those pulps prepared from hardwoods, particularly white birch pulp, to a much lower value than can be obtained with treatment by chloride dioxide alone.

Briefly, the process of the present invention comprises subjecting a chlorine dioxide-treated wood pulp to the action of an aqueous solution of an iron salt, and exposing the pulp to air or other source of free oxygen. The exposure to a source of oxygen, or aging treatment, may be conducted at various temperatures for different times. For best results, temperatures from ambient (such as 15° C.) up to about 100° C. may be employed for periods of from about 2 to 24 hours, with the time period being generally inversely proportional to the temperature. The pulp may then be subjected to optional treatment with aqueous sulfur dioxide, followed by a normal hot aqueous caustic extraction and optionally a hypochlorite bleach. Certain variations of this basic process are possible and these are described in greater detail below and in the examples which follow.

An essential feature of the process of the present invention is that the treatment with iron solution must either coincide with or follow a chlorine dioxide treatment of the pulp. Application of the iron to an unbleached pulp or to a pulp treated with chlorine has no appreciable deresinating action as will be shown by Example 1 below. The iron may be applied to the pulp either during or after the chlorine dioxide treatment, but it has been found to be much more effective if applied in a separate stage after washing the pulp free of spent chlorine dioxide liquor. This is demonstrated in Example 6 below.

A wide range of amounts of chlorine dioxide may be employed. However, amounts in excess of 100% of demand are wasteful. Minute amounts do not provide the full benefits made possible by chlorine dioxide. For practical reasons, amounts of from about 25% to 100% of demand are preferred, while amounts of from about 50% to 100% of demand provide best results. However, as will be apparent to those skilled in the art, smaller and greater amounts may be employed.

Only catalytic amounts of iron are required in this process. Deresination effects can be observed with as little as 10 p.p.m. iron on pulp and increases with increasing iron concentration up to about 1000 p.p.m. This is shown in Example 2 and in FIG. 1 of the attached drawing. It is preferred to use an iron concentration of up to about 300 p.p.m. based on pulp, preferably between about 50 to 300 p.p.m., since addition of larger quantities has only a slightly greater deresinating action. The iron is conveniently applied as an aqueous solution of a water-soluble or slightly soluble iron salt. The iron may be added as any convenient water soluble or slightly soluble, but ionizable, salt, either organic or inorganic, and in either the ferrous or ferric state. Among the iron salts which may be employed are: ferric perchlorate, ferric acetate, ferrous acetate, ferrous sulfate, ferrous ammonium sulfate, ferric ammonium sulfate, ferric sulfate, ferric chloride, ferric nitrate, ferric gluconate, and the like. For more satisfactory results, the iron salt should be one which is an ionizable salt, free from any anion which will complex or chelate the iron cation. Thus cyanides, citrates and tartrates, as well as the presence of such chelating agents as ethylene diamine tetraacetic acid ("Versene"), ferron and ortho-phenanthroline, tend to inactivate the ferric and ferrous ions. The chelation or complexing of the ferrous and ferric ions appears to inhibit their catalytic action, possibly by preventing their absorption by the pulp or by stabilizing one valence state so that the iron can no longer undergo the redox reaction which is believed to underly their catalytic activity. In the case of iron citrates, the inhibition of catalysis may be overcome by reducing the pH of the solution to a value of about 3. The effect of complexing or chelating anions is shown in Example 9 and Table VI, below. In some cases, the addition of small amounts of acid may be desirable to prevent precipitation of ferric hydroxide which may form from hydrolysis of the iron salt. When the iron is applied during the chlorine dioxide treatment, however, it is desirable to add it in the ferric state, since ferrous iron is oxidized immediately by chlorine dioxide to the ferric state, thus consuming some of the chlorine dioxide and reducing its effectiveness.

The application of iron salt to the pulp can be carried out under a wide variety of conditions. For reasons of convenience and economy, I prefer to apply the iron salt to a pulp slurry of 3–6% consistency and at available water temperatures. Only a few minutes retention time with good mixing is required in this stage.

During treatment of the pulp with the aqueous iron salt solution, a substantial proportion of the iron is absorbed by the pulp. This has been demonstrated by determining the iron concentration of the solution after contact with the pulp. In one case when 300 p.p.m. iron were employed, the unbleached pulp absorbed 40 p.p.m. of iron; after treatment with chlorine dioxide to 50% of demand, the pulp absorbed 165 p.p.m. of iron. It is mainly the absorbed iron that is responsible for the catalytic deresination, since it makes little difference whether the pulp is simply filtered from the iron solution before storage or whether it is filtered and then washed thoroughly with water. This is demonstrated by Example 8 below.

After treatment with the aqueous iron salt solution, the pulp must be permitted to come in contact with air or other source of free oxygen. As long as the supply of oxygen is adequate, the amount of water accompanying the pulp is not important. Thus the pulp can be filtered from the aqueous iron salt solution and stored as a wet sheet of relatively low consistency, or it can be further pressed or centrifuged to remove most of the free liquid and then stored either as a sheet or as crumbs. In many cases, the air introduced into the wet pulp sheet during filtration is sufficient for the purpose of this storage treatment and no additional air or oxygen need be supplied. The pulp can also be stored in a dilute slurry in water provided that sufficient oxygen is made available by bubbling air or other source of free oxygen through the slurry. Storage of the pulp under water without bubbling air or other source of oxygen through the slurry, however, is not effective. These conclusions are demonstrated by Example 4 and Table II below.

The pulp may be stored or aged in contact with air for a period of up to about 24 hours at room temperature. Longer storage times at that temperature produce no further benefits and may even be detrimental. The storage time may be shortened considerably, such as about 2 to 3 hours, if temperatures above 25° C. are used, but no advantage is obtained by using temperatures above 100° C. This is shown in Example 7 below.

It has also been discovered that the deresinating action of the process of the present invention is greatly improved by treating the stored or aged pulp with aqueous sulfur dioxide before the hot alkaline extraction of the pulp. Amounts of about 2.5 pounds or more of sulfur dioxide per ton of pulp are satisfactory. Amounts in excess of this amount provide little, if any, additional benefits. The time and temperature of sulfur dioxide treatment appear to have little effect. Short periods of time, such as for 2 minutes up to one hour, and temperatures from room temperature to elevated temperatures provide similar results. A similar although somewhat less effective result is obtained by heating the stored pulp at 95° C. for half an hour in place of the aqueous sulfur dioxide treatment. This is illustrated in Example 6 below.

The alkali extraction of the treated wood pulp completes the deresination of the pulp. Various concentrations of caustic soda solution may be employed satisfactorily, and for best results aqueous solutions of 2 to 12% sodium hydroxide based on weight of pulp. The pulp consistency at this stage is desirably about 6 to 22% based on weight of pulp. During the alkali extraction the pulp suspension is desirably heated to a temperature of between about 60 and 100° C. for about one-half to four hours' time. Pressure extraction at temperatures above 100° C. may also be used, but this adds to the cost of the process without providing any additional advantages. Resin removal from the pulp is very rapid and generally takes place largely during the first part of the alkali extraction.

After the alkali extraction step, the deresinated pulp is thoroughly washed with water. It may be subjected to further bleaching or purification treatment if desired before being sheeted and dried, or otherwise prepared for sale or further use.

The deresination process of the invention lowers the resin contents of caustic extracted and bleached pulps to about 20–50% of the values obtainable by using chlorine dioxide alone. In cases where the maximum deresinating action is not required, it is possible to use less chlorine dioxide than would normally be needed to reach a given resin level. This makes possible substantial savings in chlorine dioxide, an expensive chemical.

A number of bleached pulps which had been prepared by means of the deresination process of the invention have been analyzed to determine whether the iron persists in the finished pulp or has any other detrimental effect on the properties of the bleached pulp. In no case was the iron content of the final pulp significantly higher than that of a control pulp prepared without the use of iron. The iron had no detrimental effect on any of the other properties of the bleached pulp.

It has been found that iron salts are unique in providing deresination of chlorine dioxide treated pulps. Metallic ions other than iron are not satisfactory. Under the conditions used, some beneficial effect was exerted by salts of molybdenum, lead, palladium, ruthenium, and titanium, but iron was by far the most effective. Copper, cobalt, nickel, chromium, manganese, tin, mercury, vanadium, and cerium salts were ineffective. This is demonstrated in Example 3 and Table I below.

The mechanism by which deresination is effected by the process of the present invention is not known, and any attempt to interpret it is necessarily speculative. Accordingly, I do not wish to be bound by any theory or mechanism. However, it seems likely that some tye of air oxidation occurs during storage or aging of the pulp, and that this oxidation reaction is catalyzed by the iron absorbed by the pulp. It also appears likely that the resin has to be activated in some way by chlorine dioxide before the iron-catalyzed oxidation reaction can occur. Attempts have been made to substitute other oxidation treatments for the pulp storage, but none have been successful.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified, and resin contents were determined by solvent extraction with a mixture of equal volumes of methanol and benzene.

EXAMPLE 1

This example shows that the addition of iron to unbleached pulp or chlorine treated pulp provides no appreciable deresinating action.

A 50 gm. sample of unbleached white birch pulp, containing 2.70% resin and having a chlorine dioxide demand of 15 lb. per ton, was treated for one hour at 25° C. and 3% consistency with an aqueous solution containing 300 p.p.m. (on pulp) of iron in the form of ferric ammonium sulphate. The treated pulp was separated from the liquors by filtration, broken into crumbs and allowed to stand in contact with the air at room temperature (25° C.) for 24 hours. The resulting pulp was then heated in an oven at 95° C. for half an hour after which it was treated for 3 hours at 95° C. and 15% consistency with an aqueous solution containing 4% sodium hydroxide, 0.25% of a nonionic surfactant known as Antarox A-400 (an alkyl aryl polyethylene glycol), and 0.25% sodium pyrophosphate, all quantities being based on the weight of pulp. The pulp was washed with water, air dried and analyzed for resin by extraction of a weighed portion with an equal volume mixture of methanol and benzene. The resin content of the caustic extracted pulp was 1.70%.

A control sample, in which the treatment of the pulp with an iron solution was omitted, had a final resin content of 1.68%.

A sample of the same pulp, which had a chlorine demand of 100 lb. per ton, was treated with 55 lb. per ton of chlorine and 300 p.p.m. of iron for one hour at 25° C. and 3% consistency. The filtered pulp was stored for 24 hours at room temperature in contact with air, heated at 95° C. for half an hour, and then subjected to hot alkaline extraction as described in the foregoing paragraph. The resin content of the pulp was 2.42%. A control sample, treated in a similar way, except that no iron was added, had a resin content of 2.82%.

These results demonstrate that iron treatment of unbleached pulp or chlorine treated pulp has no appreciable deresinating action.

EXAMPLE 2

This example describes the degree of deresination obtained with varying amounts of chlorine dioxide and iron in accordance with the process of the present invention.

A series of 50 gram samples of an unbleached white birch pulp containing 2.60% resin and having a chlorine dioxide demand of 30 lb. per ton were treated with varying amounts of chlorine dioxide in the presence of various concentrations of ferric perchlorate. The treatments were carried out at 3% consistency and 25° C. for one hour. The amounts of chlorine dioxide used were 50, 75 and 100%, respectively, of the chlorine dioxide demand of the pulp. The iron concentrations used were 0, 100, 300 and 1000 p.p.m., respectively, of iron ion, based on the weight of dry pulp. Following this treatment, the pulps were filtered from the residual liquor, and stored in the air at room temperature for 16 hours. The pulp samples were then heated at 95° C. for half an hour and extracted with dilute aqueous alkali as described in Example 1. The resin contents of the various pulp samples are shown in the graph of FIG. 1 of the accompanying drawing. These results demonstrate the effect on resin removal of varying the amounts of both the chlorine dioxide and the iron added to the pulp. As shown by the curves of the graph, the addition of iron in amounts in excess of 300 p.p.m. based on dry pulp produces only slightly greater deresinating action. Best results are obtained between about 50 and 300 p.p.m. Greater deresination is obtained as larger amounts of chlorine dioxide, up to about 100% of the chlorine dioxide demand, are used.

EXAMPLE 3

This example shows the unique superiority of iron, in conjunction with chlorine dioxide, to deresinate wood pulp, as compared with other metals.

A series of 50 gm. samples of unbleached white birch pulp initially containing 3.16% resin and having a chlorine dioxide demand of 11.6 lb. per ton were treated with chlorine dioxide equal to the demand in the presence of the water-soluble salts of a number of the transition metals. The treatments were carried out at 3% consistency and 25° C. for one hour. The transition metal ion concentration used was 100 p.p.m. on pulp. Following this treatment, the pulps were filtered from the residual liquor, washed with water, and stored in the air at room temperature for 16 hours. The samples were heated at 95° C. for half an hour and then extracted with dilute alkali as described in Example 1.

The resin contents of the various pulp samples are shown in Table I below. These results show that little or no deresinating action was exhibited by salts of vanadium, chromium, manganese, nickel, copper, tin, mercury, cerium and cobalt. Salts of titanium, molybdenum, ruthenium, palladium, and lead apparently had some positive effect in reducing the resin content, but salts of iron were much more effective than any of these.

Table I

EFFECTIVENESS OF VARIOUS METAL IONS

| Metal and Valence | Compound of Metal Used | Resin Content of Final Alkali Extracted Pulp, Percent |
|---|---|---|
| iron (II) | $FeSO_4$ | 0.38 |
| iron (III) | $Fe(NH_4)(SO_4)_2$ | 0.32 |
| titanium (III) | $TiCl_3$ | 0.56 |
| vanadium (V) | $V_2O_5$ | 0.84 |
| chromium (VI) | $CrO_3$ | 0.82 |
| manganese (II) | $MnSO_4$ | 0.92 |
| cobalt (II) | $CoCl_2$ | 0.90 |
| nickel (II) | $NiCl_2$ | 0.94 |
| copper (II) | $CuSO_4$ | 0.74 |
| molybdenum (VI) | $MoO_3$ | 0.57 |
| ruthenium (III) | $RuCl_3$ | 0.66 |
| palladium (II) | $PdCl_2$ | 0.55 |
| tin (II) | $SnCl_2$ | 0.97 |
| mercury (II) | $HgCl_2$ | 0.76 |
| lead (II) | $Pb(NO_3)_2$ | 0.57 |
| cerium (V) | $Ce(NH_4)(NO_3)_6$ | 0.78 |

EXAMPLE 4

This example demonstrates the importance of bringing the pulp, treated in accordance with the present invention, into contact with a source of air or oxygen to obtain optimum deresination.

Fifty gram samples of unbleanced white birch pulps initially containing 1.87% resin and having a chlorine dioxide demand of 24 lb. per ton were treated with 24 lb. per ton of chlorine dioxide at 3% consistency and 25° C. for one hour. The pulp was filtered off, washed with water, and then treated at 3% consistency and room temperature (25° C.) with an aqueous solution of ferric perchlorate containing 300 p.p.m. of iron on pulp. The various slurries obtained were then separately treated as follows:

(a) The iron solution was filtered off on a Büchner funnel, and the wet pulp sheet (18% consistency) was stored overnight at room temperature in a polyethylene bag so that as little excess air as possible was available to the pulp sheet.

(b) The iron solution was filtered off, and the pulp was pressed to a consistency of 35% before storage in a polyethylene bag under the same conditions as in (a).

(c) The iron solution was filtered off, the pulp was pressed to a consistency of 35%, and then broken into crumbs before storage in a polyethylene bag under the same conditions as in (a).

(d) Air was bubbled slowly overnight through the pulp slurry in the iron solution at room temperature.

(e) The pulp was allowed to stand overnight at room temperature in a slurry at 3% consistency.

All pulp samples were next washed with water, then with aqueous sulfur dioxide and finally with water again before subjecting them to extraction with hot alkali in the usual way. The resin contents of the alkali-extracted pulps are shown in Table II below.

Table II

EFFECT OF STORAGE CONDITIONS ON DERESINATION

Storage conditions:     Resin in final alkali-extracted pulp, percent
(a) wet sheet (18% consistency) _____ 0.21
(b) wet sheets (35% consistency) _____ 0.24
(c) wet crumbs (35% consistency) _____ 0.28
(d) slurry (3% consistency) + air _____ 0.23
(e) slurry (3% consistency) no air _____ 1.05

The foregoing results demonstrate the wide variation possible in storage conditions and also the necessity for the pulp to have access to air or oxygen if optimum deresination is to be obtained.

EXAMPLE 5

This example shows the enhanced deresination obtained upon storage of pulps treated with iron and chlorine dioxide, in accordance with the present invention, as compared to treatment with chlorine dioxide alone.

A series of 50 gm. samples of unbleached white birch pulp initially containing 2.60% resin and having a chlorine dioxide demand of 30 lb. per ton was treated with 100% of the chlorine dioxide demand at 3% consistency and 25° C. for one hour in the presence of 300 p.p.m. of iron in the form of ferric perchlorate. The pulp was filtered from the residual liquor, washed with water and stored in contact with air at room temperature for various periods of time. Prior to hot alkaline extraction, the pulp was heated at 95° C. for half an hour. Another series of samples was treated in exactly the same way, except that the iron was omitted. The resin contents of the alkali extracted pulps are given in Table III below:

Table III

EFFECT OF STORAGE TIME

| Sample | Storage time | Resin content of alkali extracted pulp, percent |
|---|---|---|
| Chlorine dioxide plus iron | none | 1.04 |
|  | 1 day | 0.67 |
|  | 2 days | 0.78 |
| Chlorine dioxide alone | none | 1.07 |
|  | 1 day | 1.15 |
|  | 2 days | 1.19 |

These results show that storage of the pulp in the presence of iron is necessary to produce optimum deresinating action. Storage of pulp to which no iron has been added has no beneficial effect.

EXAMPLE 6

This example shows the value of treating the pulp with iron in a separate and subsequent treatment after treatment with chlorine dioxide.

A series of experiments was carried out to determine the effect of a number of factors on the deresinating action of the iron. Unbleached white birch pulp containing 2.60% resin and having a chlorine dioxide demand of 30 lb. per ton was used. The conditions for the chlorine dioxide treatment and the hot alkaline extraction were the same as those described in the foregoing examples.

In some cases, 300 p.p.m. of iron as ferric perchlorate was added during the chlorine dioxide treatment, and in other cases the pulp was washed after the chlorine dioxide treatment and then treated with an aqueous solution of the iron salt at 3% pulp consistency and room temperature. In all cases, the pulp was filtered from any liquors before storage in air at room temperature for one day.

A number of treatments prior to the hot alkaline extraction stage were investigated. These included (a) heating at 95° C. for half an hour, (b) slurrying the pulp with an aqueous solution of sufficient sulfur dioxide to bring the pH to about 3 (ca. 3–5 lb. per ton sulfur dioxide at 3% pulp consistency and room temperature), (c) combination of sulfur dioxide treatment followed by heating at 95° C. for half an hour, and (d) no pretreatment.

The pertinent conditions used for each pulp sample and the results obtained in each case are given in Table IV below:

Table IV
EFFECT OF VARIOUS CONDITIONS OF PULP TREATMENT

| Iron addition | Treatment prior to hot, alkaline extraction | Resin content of alkali extracted pulp, percent |
| --- | --- | --- |
| none | heat at 95° C | 1.15 |
| 300 p.p.m. with ClO₂ | none | 0.70 |
| 300 p.p.m. with ClO₂ | heat at 95° C | 0.58 |
| 300 p.p.m. after ClO₂ | none | 0.47 |
| 300 p.p.m. after ClO₂ | heat at 95° C | 0.35 |
| 300 p.p.m. after ClO₂ | sulfur dioxide | 0.24 |
| 300 p.p.m. after ClO₂ | sulfur dioxide and heat at 95° C. | 0.25 |

The foregoing results show that it is much more effective to add the iron in a separate stage after the chlorine dioxide treatment than to add it along with the chlorine dioxide in the same stage. They also demonstrate that a sulfur dioxide treatment after the pulp storage stage and before the alkaline extraction stage is more effective than heating the pulp. Heating the pulp is of course more effective than no treatment at all in lowering the resin content.

EXAMPLE 7

This example shows that prolonged storage of the treated pulp in contact with air at elevated temperatures serves no useful purpose and may be detrimental.

A series of experiments was conducted to see whether storage of the pulp at higher temperatures would enable the storage time to be reduced. The unbleached white birch pulp employed as starting material in Example 4 was used. 50 gm. pulp samples were treated with 24 lb. per ton of chlorine dioxide at 3% consistency and 25° C. for one hour. The pulp was filtered from the residual liquor, washed thoroughly with water, and then slurried at 3% consistency with an aqueous solution containing 300 p.p.m. of iron (as ferric perchlorate) based on the weight of pulp. After a few imnutes, the pulp was filtered off and washed with water. Samples were then heated in ovens at 75°, 90° and 105° C., respectively, before treatment with sulfur dioxide and extraction with hot alkali in the usual way. The conditions of pulp storage and the resin contents of the alkali extracted pulp are shown in Table V below:

Table V
EFFECT OF STORAGE TEMPERATURE

Storage conditions: Resin content of alkali extracted pulp, percent
- 16 hours at 25° C _____ 0.30
- 3 hours at 75° C _____ 0.43
- 3 hours at 90° C _____ 0.47
- 2 hours at 105° C _____ 0.98
- Control, no iron added, 1 day at 25° C _____ 1.15

EXAMPLE 8

Fifty gm. samples of an unbleached white birch pulp containing 2.6% resin, and having a chlorine dioxide demand of 30 lbs. per ton were treated with chlorine dioxide to 50% of demand at 3% pulp consistency and 25° C. for one hour. The pulp was washed and then treated with an aqueous solution of ferric perchlorate containing 300 p.p.m. of iron on pulp. One sample was filtered from the iron solution and stored overnight at room temperature before treatment with aqueous sulfur dioxide and a normal hot alkaline extraction. The resin content of the extracted pulp was 0.29%. The other sample was treated in exactly the same manner, except that it was washed thoroughly with water before storage. The resin content of the extracted pulp was 0.33%. A control sample prepared without the use of an iron salt had a resign content of 0.95%.

EXAMPLE 9

This example shows the effect of various anions on the catalytic activity of the iron salts.

A series of experiments was conducted treating unbleached white birch pulp with 100% of the chlorine dioxide demand, washing the pulp with water and treating the pulp with 300 p.p.m. of iron in the form of the salt indicated in Table VI below. The pulp was permitted to stand overnight at room temperature, followed by treatment with sulfur dioxide as described in Example 6, followed by extraction with a 4% aqueous solution of sodium hydroxide as in Example 1. The results are shown in Table VI below.

Table VI
EFFECTS OF VARIOUS ANIONS ON IRON CATALYSIS

Iron salt: Resin content of final alkali extracted pulp, in percent
- None (control) _____ 0.56
- Ferric perchlorate _____ 0.11
- Ferric chloride _____ 0.07
- Ferric nitrate _____ 0.12
- Ferrous ammonium sulphate _____ 0.12
- Ferric ammonium sulphate _____ 0.12
- Ferrous sulphate _____ 0.06
- Ferric perchlorate+dibasic sodium phosphate_ 0.21
- Ferric perchlorate+potassium cyanide _____ 0.52
- Ferric perchlorate+sodium citrate _____ 0.48
- Ferric perchlorate+sodium potassium tartrate_ 0.46
- Ferric perchlorate+sodium acetate _____ 0.12
- Ferric perchlorate+sodium gluconate _____ 0.14
- Ferric perchlorate+sodium citrate+acid to pH 3 _____ 0.18
- Ferric perchlorate+gluconic acid _____ 0.10

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. In a method of removing resin from wood pulp, the steps comprising adding to a wood pulp treated with chlorine dioxide an aqueous solution of an iron salt, exposing the pulp to the action of a source of free oxygen, followed by extracting the pulp with an aqueous alkaline solution.

2. A method of claim 1 wherein the iron salt is employed in an amount of between about 10 and 1000 p.p.m. of iron based on weight of pulp.

3. A method of claim 1 wherein the iron salt is employed in an amount of between about 50 and 300 p.p.m. of iron based on weight of pulp.

4. In a method of removing resin from wood pulp, the steps comprising adding chlorine dioxide and an aqueous solution of an iron salt to a wood pulp, exposing the pulp to the action of a source of free oxygen, followed by extracting the pulp with an aqueous alkaline solution.

5. A method of claim 4 wherein the addition of chlorine dioxide and the aqueous solution of an iron salt is carried out substantially concurrently.

6. A method of claim 4 wherein the addition of an aqueous solution of an iron salt is carried out subsequent to the addition of the chlorine dioxide but prior to exposing the pulp to the action of a source of free oxygen.

7. A method of claim 4 wherein the iron salt is employed in the absence of an ion capable of complexing the iron.

8. A method of claim 4 wherein the chlorine dioxide is employed in an amount of between about 50% and 100% of the chlorine dioxide demand of the wood pulp.

9. A method of claim 4 wherein the amount of iron salt employed is between about 10 and 1000 p.p.m. of iron based on weight of pulp.

10. A method of claim 4 wherein the amount of iron salt employed is between about 50 and 300 p.p.m. of iron based on weight of pulp.

11. In a method of removing resin from wood pulp, the steps comprising adding chlorine dioxide and an aqueous solution of an iron salt to a wood pulp, exposing the pulp to the action of a source of free oxygen, adding an aqueous solution of sulfur dioxide to the pulp, followed by extracting the pulp with an aqueous alkaline solution.

12. In a method of removing resin from wood pulp, the steps comprising adding chlorine dioxide and an aqueous solution of an iron salt to a wood pulp, exposing the pulp to the action of a source of free oxygen, adding an aqueous solution of sulfur dioxide to the pulp, extracting the pulp with an aqueous alkaline solution, and finally adding to the pulp an aqueous hypochlorite bleach solution.

13. In a method of removing resin from wood pulp, the steps comprising adding chlorine dioxide and an aqueous solution of an iron salt to a wood pulp, exposing the pulp to the action of a source of free oxygen, heating the pulp, and extracting the pulp with an aqueous alkaline solution.

References Cited in the file of this patent

UNITED STATES PATENTS

| | | |
|---|---|---|
| 1,860,431 | Richter | May 31, 1932 |
| 2,166,330 | Vincent | July 18, 1939 |
| 2,494,542 | Casciani | Jan. 17, 1950 |
| 2,903,326 | Heitman | Sept. 8, 1959 |